United States Patent [19]

Hara et al.

[11] 4,322,470

[45] Mar. 30, 1982

[54] RESIN COMPOSITIONS COMPRISING AMINE OR AMMONIA SALTS OF MALENIZED BUTADIENE POLYMERS ARE USED TO FORM FIBROUS LAMINATES

[75] Inventors: Hajime Hara, Fujisawa; Shingo Orii, Kawasaki; Yoshihiko Araki, Tokyo, all of Japan

[73] Assignee: Nippon Oil Co., Ltd., Tokyo, Japan

[21] Appl. No.: 119,612

[22] Filed: Feb. 8, 1980

[30] Foreign Application Priority Data

Feb. 13, 1979 [JP] Japan .................................. 54/14214
May 22, 1979 [JP] Japan .................................. 54/62179

[51] Int. Cl.$^3$ ...................... B32B 27/04; B32B 27/12; C09J 3/14
[52] U.S. Cl. .................................. 428/246; 156/307.3; 156/308.2; 156/334; 156/335; 525/68; 525/502; 428/251; 428/271; 428/272; 428/273; 428/278; 428/511; 428/531

[58] Field of Search ............... 428/246, 251, 271, 272, 428/273, 278, 511, 531; 156/307.3, 308.2, 334, 335; 525/502, 68

[56] References Cited

U.S. PATENT DOCUMENTS

| 3,455,859 | 7/1969 | Korpman | 525/502 |
| 3,658,736 | 4/1972 | Daimer et al. | 525/68 |
| 3,969,321 | 7/1976 | Kako et al. | 525/502 |
| 4,016,022 | 4/1977 | Browning | 525/502 |

*Primary Examiner*—James C. Cannon
*Attorney, Agent, or Firm*—Jordan and Hamburg

[57] ABSTRACT

A curable resin composition consisting essentially of an amidated polybutadiene and a phenolic resin, and a laminate containing the resin composition in cured form and having excellent electrical properties and cold punching workability.

5 Claims, No Drawings

RESIN COMPOSITIONS COMPRISING AMINE OR AMMONIA SALTS OF MALENIZED BUTADIENE POLYMERS ARE USED TO FORM FIBROUS LAMINATES

This invention relates to novel resin compositions and also to laminates using therein the same as a curable bonding agent. More particularly, it relates to curable resin compositions comprising a phenolic resin and an amidated maleinized polybutadiene prepared by reacting a low molecular weight maleinized polybutadiene with ammonia and/or a primary amine compound and it also relates to laminates, such as laminated boards for electrical equipments, using therein the curable resin composition as a bonding agent and having excellent electrical properties and cold punching workability.

Phenolic resins have various excellent properties for their considerably low cost, while they are seriously disadvantageous in that they are hard and brittle.

In telegraph instruments and electric equipments, there have been required laminated boards having high-grade electrical and physical properties with their recent technical advances. Particularly, laminated boards having good electrical properties and cold punching workability have increasingly been required.

In attempts to meet these requirements, there have heretofore been proposed many methods for producing flexible phenolic resins, such as a method comprising adding a thermoplastic polymer or a plasticizer to a phenolic resin, a method using a long-chain hydrocarbon substituted phenol derivatives and a method comprising adding rubber to a phenolic resin.

However, a thermoplastic polymer or a plasticizer is only in the form of a physical mixture with phenolic resins and it must be incorporated therein in a large amount to render the resins flexible. When the phenolic resins have been cured, these additives are hardly dissolved in the cured resins and tend to exude therefrom thereby causing troubles such as a decrease in physical and electrical properties of the cured resin on heating.

A phenolic resin prepared using a long-chain hydrocarbon substituted phenol derivative is sparingly soluble in an alcoholic solvent, which is generally used for making a varnish for laminates, and exhibits unsatisfactory electrical and physical properties after cured.

Rubber is very difficult to handle to make a varnish therefrom. Thus, satisfactory results have not yet been obtained thereby.

It is also known that drying natural oils, such as tung oil, which are reactive with phenol and phenolic resins, may be used as a reactive plasticizer for eliminating the aforesaid disadvantages. However, it is difficult to select appropriate conditions of a reaction between tung oil and phenol because of the great reactivity of the former. Natural drying oils are unreliably available and greatly fluctuating in price because of being a natural product. The physical and electrical properties of a tung oil modified phenolic resin are not necessarily satisfactory for the requirements in compliance with the advances of electronic technology.

For these reasons, it is desired and required that a new more suitable reactive plasticizer be substituted for tung oil.

Thus, there have been made many attempts to make use of polybutadiene as a reactive plasticizer. For example, there is proposed a method for producing flexible coatings prepared by curing liquid polybutadiene with a phenol-formaldehyde resin (Journal of Paint Technology, 39 523 (1967) and Japanese Patent Application Laying-Open Gazette No. 61493/75 for example). However, this method is seriously disadvantageous in that it requires a suitable catalyst and a high baking temperature and also requires a specific phenol-formaldehyde resin prepared using a specific alkylphenol. The reason for this is that hydrocarbon polymers, such as liquid polybutadiene, is quite incompatible with phenol-formaldehyde resins prepared using phenol. Such oil-insoluble phenol-formaldehyde resins are important resins widely usable in the preparation of laminates and the like.

There have further been proposed methods for the preparation of a resin having flexibility after having been cured, which comprise reacting a phenolic compound with liquid polybutadiene in the presence of an acid catalyst and then reacting the resulting reaction product with formaldehyde to form a modified phenolic resin. However, in a case where the resin so formed is used as a curing agent in the preparation of laminates, there are many vital disadvantages. For example, the modified phenolic resin is poorly compatible with a non-modified phenolic resin and sparingly soluble in an alcoholic solvent, and, further, its varnish is unsatisfactorily impregnated into paper or cloth.

It has been found by the present inventors that liquid polybutadiene which is incompatible with a phenol-formaldehyde resin may be specifically modified to produce therefrom a polymer which is highly compatible with a phenol-formaldehyde resin and that there may be provided a resin composition comprising the modified polybutadiene and phenol-formaldehyde resin, the composition giving excellent flexibility when cured.

More particularly, the resin composition of this invention is obtained by incorporating a phenolic resin with an amide group-containing polybutadiene derivative (hereinafter referred to as "amidated polybutadiene or amidated butadiene polymer") prepared by reacting a butadiene homopolymer or copolymer having a number-average molecular weight of 300–10,000 with maleic anhydride and then reacting the thus maleinized polymer with ammonia and/or a primary amine. Not only the amidated polybutadiene is compatible with an oil-insoluble phenol resin but also they will be cured together under heat thereby to produce a cured resin having excellent flexibility as well as remarkably improved electrical properties, chemical resistance and the like, this finding being really surprising.

The resin composition is dissolved in a polar solvent and the resulting varnish is impregnated into paper, cloth or the like, and the resulting prepregs are then pressed together under heat to obtain laminates having excellent electrical properties and cold punching workability.

An object of this invention is to provide a novel resin composition consisting essentially of the amidated butadiene polymer and a phenolic resin, the resin composition being useful as material for coatings and the like.

Another object of this invention is to provide laminates in which the resin composition is used as the curable impregnant, the laminates having excellent electrical properties and cold punching workability.

The amidated polybutadiene used in this invention may be synthesized by reacting a butadiene homopolymer or a butadiene copolymer containing at least 50% of the butadiene units having a number-average molecular weight of 300–10,000 (these butadiene homopolymers and copolymers being referred to as "butadiene polymer" throughout the specification and claims), with maleic anhydride and then reacting the thus maleinized polymer or copolymer with ammonia and/or a primary amine.

The starting butadiene polymers (including homopolymers and copolymers) used in this invention preferably include butadiene homopolymers prepared by the polymerization of butadiene alone, copolymers prepared by the copolymerization of butadiene and a vinyl monomer such as styrene, and copolymers prepared by the copolymerization of butadiene and a diolefin such as isoprene, these polymerization and copolymerization being carried out, for example, in a hydrocarbon solvent in the presence of an alkali metal, such as lithium or sodium, or an organometallic compound thereof as a catalyst. They also preferably include butadiene homopolymers and copolymers prepared by the polymerization or copolymerization of butadiene using an alkali metal such as sodium as a catalyst and using a polycyclic aromatic compound such as anthracene as an activating agent in a polar solvent such as tetrahydrofuran. In addition, they may further include butadiene homopolymers and copolymers prepared using a transition metal catalyst or a coordination anionic polymerization catalyst, and those prepared by the telomerization of butadiene in the presence of a radical initiator.

The number-average molecular weight of the butadiene polymers used in this invention is in the range of 300–10,000, preferably 500–5,000. The use of a butadiene polymer having a number-average molecular weight of smaller than 300 will give a cured resin having poor flexibility, remarkably low strength, low heat resistance and low chemical resistance, since the molecular weight between the bridging points of the polymer is too small. The use of a butadiene polymer having a number-average molecular weight of more than 10,000 will result in the production of a resin composition having remarkably high viscosity whereby the resin composition is rendered difficult to handle and, therefore, a uniform cured resin is also difficult to obtain therefrom.

The butadiene polymers used in this invention are not limited in microstructure thereof and both 1,2-polybutadiene and 1,4-polybutadiene may be used.

The maleinized butadiene polymers, copolymers and mixtures thereof used in this invention may be prepared by reacting the starting butadiene polymers, copolymers or mixtures thereof with maleic anhydride at 100°–300° C. by a known conventional method. It is preferable to inhibit gel formation by adding to the reaction mixture an inhibitor such as phenylenediamines, pyrogallols or naphthols. The amount of maleic anhydride added in the maleinized reaction is in the range of preferably 0.05–0.7, more preferably 0.1–0.5, most preferably 0.1–0.25, mol per 100 g of the butadiene polymer.

The adduct of a butadiene polymer with maleic anhydride (the adduct being hereinafter sometimes referred to as "maleinized butadiene polymer") is then reacted with ammonia and/or a primary amine to obtain the corresponding amide compound. The succinic anhydride groups contained in the maleinized butadiene polymer may be easily reacted with ammonia or a primary amine to form an amide and carboxylic acid (succinamic acid group). In a case where more than one equivalent of ammonia or amine is added to one equivalent of succinic anhydride group, it is considered that not only the amide is formed but also carboxylates may be produced simultaneously. At a somewhat higher temperature, succinamic acid group may suffer dehydration to form an amide.

In this invention any amidated butadiene polymers should preferably be used; even if carboxylic acid salts and succinimide groups are contained partly in the polymers, these polymers may be used without any troubles as far as they are obtained under the reaction conditions to be described later. This amidation reaction usually proceeds sufficiently rapidly and may be effected at 0° to 120° C., preferably, ambient temperature to 50° C. It is not desirable to effect the reaction at a temperature higher than 120° C. since the dehydration reaction is likely to further proceed whereby succinamic acid groups are converted entirely to succinimide groups. The reaction may be effected in the presence or absence of a solvent. In a case where the solvent is used, it is preferable that the solvent be a hydrocarbon solvent or ether type solvent which is not reactive with ammonia, an amine, a carboxylic acid or the like. In addition, it is of course possible to use even a reactive solvent, such as an alcohol, in such a manner that a part of the succinic anhydride groups suffer esterification with the alcohol to synthesize a polymer having both amide and ester groups.

In this invention, gaseous ammonia or concentrated aqueous ammonia may be added to the maleinized butadiene polymer or a solution thereof. The primary amine used in this invention is a compound represented by the following formula

R—NH$_2$ wherein R is an alkyl group, aryl group, alkaryl group or aralkyl group having 1–20 carbon atoms. The amount of ammonia or the primary amine used is preferably in the range of 0.2–3.0 mol per mol of succinic anhydride group. The amidated butadiene polymer which is water soluble could be obtained by increasing the amount of ammonia or the primary amine used in the preparation of said polymer, and it may be blended directly with a water soluble phenolic resin.

The phenolic resin also used in this invention may be one obtained by a heretofore known method or, if desired, it may also be produced in situ in the presence of the amidated butadiene polymer. Phenolic resins may generally be obtained by reacting a phenolic compound with an aldehyde in the presence of an acid or a base catalyst; however, phenolic resins (also called resol) obtained in the presence of a basic catalyst are preferably used in this invention.

Phenolic compounds used for preparing the phenolic resins may include phenol, cresol, xylenol and other alkylphenols as well as resorcin, bisphenol and the like. These phenolic compounds may be used alone or in combination. Aldehydes used for preparing the phenolic resins may include formaldehyde as well as formaldehyde-producing compounds such as paraformaldehyde. Bases used as a catalyst for condensation may preferably include the alkali metal hydroxides and alkaline earth metal hydroxides as well as ammonia and amines. The amidated butadiene polymer and the phenolic resin, which are synthesized separately, may be mixed for cure, or a phenolic compound and an aldehyde may be condensed together in the presence of the amidated butadiene polymer. The amidated butadiene polymer and the phenolic resin may be mixed together in widely varying ratios whereby is obtained a cured product having various particular properties. It is usually preferable to mix the amidated butadiene polymer with a phenolic resin in ratios by weight of from 20:80 to 80:20 in order to obtain a cured product having the desirable properties of both the said butadiene polymer and the said phenolic resin.

The heat curable composition of this invention consisting essentially of the amidated butadiene polymer and a phenolic resin such as a phenol-formaldehyde resin, may be cured at a temperature of 100°–250° C. even without the addition of a catalyst thereto.

The amidated butadiene polymer and the phenolic resin, which are essential components in the resin composition, are dissolved in at least one solvent selected from alcohols such as methanol, ethanol, and butanol; ketones such as acetone and methyl ethyl ketone; aromatic hydrocarbons such as benzene, toluene and xylene; and the like, thereby to prepare a varnish. The thus prepared varnish is impregnated into fibrous materials and then impregnated fibrous materials are dried to obtain prepregs containing the dried resins in a total amount by weight of 30–70%, preferably, 35–55%. The fibrous materials include paper, cloth, synthetic fiber cloth, asbestos cloth and glass fiber cloth.

A desired number of the thus obtained prepregs are cured usually at a pressure of 200 Kg/cm$^2$ and a temperature of 140°–180° C. for 20–180 minutes, thereby to obtain laminates as the final product.

This invention will be better understood by the following examples wherein all parts are by weight unless otherwise specified.

EXAMPLE 1

One thousand grams (1000 g) of a butadiene polymer having a number-average molecular weight of 1850 and a vinyl bonding content of 60%, prepared using a benzyl sodium catalyst, 155 g of maleic anhydride, 2 g of N-phenyl-N'-isopropyl-p-phenylenediamine and 10 g of xylene were charged into a 3-liter separable flask equipped with a reflux condenser, to form a mixture which was reacted at 195° C. for 5 hours after the thus charged flask had been purged with nitrogen.

After the completion of the reaction, the reaction mixture was freed from the solvent and unreacted materials by distilling them off under a reduced pressure thereby obtaining a maleinized polybutadiene having an acid value of 78 mg KOH/g.

Then, 1000 g of the maleinized polybutadiene so obtained and 200 g of diglyme (diethylene glycol dimethyl ether) were introduced into a 3-liter separable flask equipped with a reflux condenser to form a mixture which was heated to 50° C. and incorporated dropwise with 142 g of a 25% aqueous ammonia under agitation over a period of time of about 45 minutes. After the addition of aqueous ammonia, the reaction mixture was maintained at 50° C. for one hour, and then it was raised in temperature to 80° C. and freed from the volatile materials by distilling it at a reduced pressure of 5 mmHg for one hour, thereby to obtain an amidated butadiene polymer.

One hundred (100) parts of liquid resol prepared by reacting formaldehyde with phenol in a molar ratio of 1.2 in the presence of ammonia as the catalyst, were mixed with 100 parts of said amidated butadiene polymer to form a resin composition which was dissolved in a toluene/methanol (1/1 by weight) solvent to obtain a 50% solution of the resin composition therein. The solution so obtained was a transparent uniform solution.

A part of the thus obtained resin composition solution was spread on a thin aluminum sheet and then baked at 150° C. for 30 minutes to obtain a transparent thin film which was peeled from the aluminum sheet, measured for thickness and found to be 0.1 mm in thickness. Even when the film was bent 180°, it did not produce cracks and crazes.

The film was immersed in acetone for 3 days to test for the resistance thereof with the result that it did not change in appearance after the test and the bending test brought no cracks and crazes as before the immersion test. Further, it was measured for weight loss after the immersion with the result that the loss was only 3%, this proving the crosslinking in the film had far proceeded.

For comparison, the procedure of Example 1 was followed except that the same resol alone (without being mixed with the amidated butadiene polymer) was used, to obtain an 0.1 mm thick film. The film so obtained was subjected to the same bending test as above with the result that it was brittle and broken with cracks soon when attempted to be bent.

EXAMPLE 2

One hundred (100) parts of a commercially available water-soluble phenol resin of 68% solid matter consistency (produced under the trademark of BRL-120 by Showa Union Gosei Co.) and 102 parts of the same amidated butadiene polymer as used in Example 1 were mixed together. The resulting mixture was diluted with 284 parts of Butylcellosolve to obtain a solution having a 35% resin content. In the same manner as in Example 1, the solution so obtained was coated, baked at 150° C. for 30 minutes and peeled to obtain an 0.2 mm thick transparent film. The film so obtained was subjected to the same 180° bending test as in Example 1 with the result that it neither cracked nor crazed when bent 180° (or folded in two).

After subjected to the same acetone immersion test as in Example 1, the film still retained its original strength and flexibility with a weight loss of only 5%.

EXAMPLE 3

One thousand grams (1000 g) of the maleinated polybutadiene having an acid value of 78 mg KOH/g as obtained in Example 1 and 200 g of diglyme were introduced into a 3-liter separable flask equipped with a reflux condenser to form a mixture which was heated to 50° C., incorporated dropwise with 94 g of monoethylamine under agitation over a period of time of about one hour and, after the end of the incorporation, continued to react at 50° C. for two hours.

Then, 118 parts of the resulting reaction mixture was mixed with 100 parts of the liquid resol as obtained in Example 1, and the whole mass was dissolved in a toluene/methanol (1/1 by weight) solvent to obtain a 50% solution thereof.

In the same manner as in Example 1, the solution so obtained was spread or coated on a thin aluminum sheet and baked at 150° C. for 30 minutes to obtain a transparent thin film of 0.1 mm in thickness. The film so obtained neither cracked nor crazed when bent 180° (or folded in two) and it also exhibited satisfactory resistance to acetone.

EXAMPLE 4

A 3-liter separable flask equipped with a reflux condenser was charged with 1000 g of a butadiene polymer which was mainly of cis-1,4 structure and had a number-average molecular weight of 3110, the polymer being prepared by the polymerization of butadiene using a nickel catalyst, 114 g of maleic anhydride, 2 g of N-phenyl-N'-isopropyl-p-phenylenediamine and 10 g of xylene, to form a mixture. The flask so charged was purged with nitrogen and the mixture in the flask was reacted at 195° C. for 5 hours.

After the end of the reaction, the resulting reaction mixture was freed from the solvent and the unreacted materials by distilling them off under a reduced pressure, thereby to obtain a maleinized polybutadiene having an acid value of 58 mg KOH/g.

Then, 1000 g of the maleinized polybutadiene so obtained and 200 g of diglyme were introduced into a 3-liter separable flask to form a mixture which was heated to 50° C. and incorporated dropwise with 70 g of a 25% aqueous ammonia over a period of time of about 30 minutes. After the completion of the incorporation, the whole mass was maintained at 50° C. for one hour, thereafter raised in temperature to 80° C. and then freed from the volatile materials by distilling it off for one hour under a reduced pressure of 5 mmHg.

One hundred (100) parts of the resulting reaction mixture were blended with 80 parts of the liquid resol as obtained in Example 1 to form a resin composition which was dissolved in a toluene/methanol (1/1 by weight) solvent to obtain a 50% solution thereof. The solution so obtained was also a transparent one.

A part of the thus obtained solution of the resin composition was spread on a thin aluminum sheet, baked at 150° C. for 30 minutes and peeled from the sheet thereby obtaining an 0.2 mm thick transparent thin film. The film so obtained neither cracked nor crazed when bent 180° (folded in two), this indicating that the film had excellent flexibility.

The film still retained its flexibility with its weight loss being 5% even after the immersion thereof in acetone for 3 days, this proving that the film had satisfactory resistance to acetone.

Synthesis 1 (Synthesis of amidated butadiene polymer)

One thousand (1000) grams of a butadiene polymer having a number-average molecular weight of 980 and a vinyl content of 56%, prepared by polymerizing butadiene using a benzyl sodium catalyst, and 207 g of maleic anhydride were reacted at 195° C. for 5 hours to obtain a maleinized butadiene polymer having an acid value of 98 mg KOH/g.

Then, 1000 g of the thus obtained maleinized butadiene polymer and 873 g of toluene were introduced into a 3-liter separable flask equipped with a reflux condenser. The mixture was heated to 50° C. and incorporated with 121 g of a 25% aqueous ammonia dropwise under agitation over a time period of about 30 minutes. After the completion of the incorporation with the aqueous ammonia, the reaction mixture was maintained at 50° C. for one hour and then the temperature raised to 80° C. to distil off substantially all of the water under a reduced pressure (the azeotropic distillation between the toluene and water). Then, 515 g of methanol were added to the distillation bottom to obtain a 50 weight % resin content toluene/methanol (1/1 by weight) solution of the amidated butadiene polymer.

Synthesis 2 (Synthesis of amidated butadiene polymer)

One thousand (1000) grams of a cis-1,4-butadiene polymer having a number-average molecular weight of 2,000, prepared by polymerizing butadiene in the presence of a nickel catalyst, were reacted with 175 g of maleic anhydride to obtain a maleinized butadiene polymer having an acid value of 85 mg KOH/g. In the same manner as in Synthesis 1, the thus obtained maleinized polymer was reacted with aqueous ammonia to obtain an amidated butadiene polymer which was dissolved in a toluene/methanol (1/1 by weight) solvent thereby obtaining a 50% varnish of the amidated polymer therein.

Synthesis 3 (Synthesis of amidated butadiene polymer)

One thousand grams (1000 g) of a maleinized butadiene polymer having an acid value of 98 mg KOH/g, prepared from the same butadiene polymer having a number-average molecular weight of 980 as used in Synthesis 1, and 581 g of toluene were introduced into a 3-liter separable flask equipped with a reflux condenser. The mixture was heated to 50° C. and incorporated dropwise with 163 g of aniline under agitation over a period of time of about 30 minutes, after which the reaction mixture was further maintained at 50° C. for one hour. The resulting amidated butadiene polymer was incorporated with 582 g of methanol to obtain a 50% toluene/methanol (1/1 by weight) solution of the amidated polymer.

Synthesis 4 (Synthesis of amidated butadiene polymer)

One thousand (1000) grams of a butadiene polymer having a number-average molecular weight of 680 and a vinyl content of 55%, prepared by polymerizing butadiene using a benzyl sodium catalyst, and 406 g of maleic anhydride were reacted at 195° C. for 5 hours to obtain a maleinized butadiene polymer having an acid value of 165 mg KOH/g.

Then, 1000 g of the thus obtained maleinized butadiene polymer were placed in a 3-liter separable flask equipped with a reflux condenser and were heated to 100° C. 150 g of a 25% aqueous ammonia were added dropwise for about 30 minutes under agitation at 100° C., then the reaction mixture was maintained at 110° C. for one hour. The obtained amidated polybutadiene was dissoled in 952 g of methanol to prepare a varnish thereof (50 wt. % resin content) in methanol.

Synthesis 5 (Synthesis of phenolic resin)

Four hundred and eighty-five grams (485 g) of a 37% aqueous solution of formaldehyde, 470 g of phenol and 34 g of a 25% aqueous solution of ammonia were reacted together at 90° C. for 30 minutes. The water was removed by a reduced pressure distillation and then a toluene/methanol (1/1 by weight) mixed solvent was added to the distillation bottom to obtain a 50% varnish of the resulting phenolic resin.

EXAMPLES 5-8

The amidated butadiene polymer solutions or varnishes obtained in Syntheses 1-4 were blended with the phenolic resin varnish obtained in Synthesis 5 as indicated in Table 1 to obtain mixed varnishes which were each impregnated into cotton linter paper sheets and then dried thereby to obtain prepregs.

Nine (9) of the thus obtained prepregs were piled on one another and then cured at 160° C. and 100 Kg/cm² for 80 minutes thereby obtaining a 1.6 mm thick laminated board. The laminated board so obtained exhibited excellent electrical properties and cold punching workability as indicated in Table 1.

TABLE 1

|  |  | Example 5 | Example 6 | Example 7 | Example 8 |
|---|---|---|---|---|---|
| Blending ratio of varnishes (by weight) | Varnish of Synthesis 1 | 50 Parts | — | — | — |
|  | Varnish of Synthesis 2 | — | 60 Parts | — | — |
|  | Varnish of Synthesis 3 | — | — | 60 Parts | — |
|  | Varnish of Synthesis 4 |  |  |  | 50 Parts |
|  | Varnish of Synthesis 5 | 50 Parts | 40 Parts | 40 Parts | 50 Parts |
| Insulation resistance ($\Omega$) |  | $3 \times 10^{13}$ | $5 \times 10^{13}$ | $5 \times 10^{13}$ | $2 \times 10^3$ |
| Dielectric constant 1 MHz |  | 4.0 | 4.2 | 4.2 | 4.0 |
| Dielectric loss tangent |  | 0.03 | 0.03 | 0.04 | 0.03 |
| Punch workability | Punching temp. (°C.) | 25–70 | 25–70 | 25–70 | 25–70 |
|  | ASTM D-617 | Satisfactory | Excellent | Excellent | Excellent |

What is claimed is:

1. A laminate prepared by impregnating a resin composition consisting essentially of (1) an amidated butadiene polymer prepared by reacting a butadiene polymer having a number-average molecular weight of 300–10,000 with maleic anhydride and then reacting the resulting maleinized butadiene polymer with at least one member selected from the group consisting of ammonia and primary amines and (2) a resol, into fibrous materials, piling the thus obtained prepregs and then curing the piled prepregs together to obtain the laminate.

2. A resin composition according to claim 1, wherein the amidated butadiene polymer and the resol are contained in a ratio by weight of from 20:80 to 80:20.

3. A resin composition according to claim 1 or 2, wherein the resol is one prepared by reacting a phenolic compound selected from the group consisting of phenol, alkyl phenols with an alkyl group having 1–20 carbon atoms, resorcine and bisphenol, with an aldehyde selected from the group consisting of formaldehyde, paraformaldehyde and other formaldehyde-producing compounds, in the presence of a base as the catalyst.

4. A laminate prepared by impregnating a resin composition consisting essentially of (1) an amidated butadiene polymer prepared by reacting a butadiene polymer having a number-average molecular weight of 300–10,000 with maleic anhydride and then reacting the resulting maleinized butadiene polymer with at least one member selected from the group consisting of ammonia and primary amines and (2) a phenolic resin, into fibrous materials, piling the thus obtained prepregs and then curing the piled prepregs together to obtain the laminate.

5. A laminate according to claim 4, wherein the fibrous materials are those selected from the group consisting of paper sheets, natural fiber cloths, synthetic fiber cloths, asbestos cloths and glass fiber cloths.

* * * * *